United States Patent
Dayan et al.

(10) Patent No.: US 12,432,048 B2
(45) Date of Patent: Sep. 30, 2025

(54) AGENTLESS SINGLE SIGN-ON TECHNIQUES

(71) Applicant: CyberArk Software Ltd., Petach-Tikva (IL)

(72) Inventors: Tomer Dayan, Petach-Tikva (IL); Yaron Nisimov, Kfar Saba (IL)

(73) Assignee: CyberArk Software Ltd., Petach-Tikva (IL)

(*) Notice: Subject to any disclaimer, the term of this patent is extended or adjusted under 35 U.S.C. 154(b) by 26 days.

(21) Appl. No.: 17/806,698

(22) Filed: Jun. 13, 2022

(65) Prior Publication Data

US 2023/0403138 A1 Dec. 14, 2023

(51) Int. Cl.
*H04L 9/08* (2006.01)
*H04L 9/32* (2006.01)

(52) U.S. Cl.
CPC .......... *H04L 9/0825* (2013.01); *H04L 9/0852* (2013.01); *H04L 9/3213* (2013.01); *H04L 9/3239* (2013.01)

(58) Field of Classification Search
CPC ... H04L 9/0825; H04L 9/0852; H04L 9/3213; H04L 9/3239
See application file for complete search history.

(56) References Cited

U.S. PATENT DOCUMENTS

| | | | | |
|---|---|---|---|---|
| 5,495,533 A * | 2/1996 | Linehan | ................ | H04L 9/0822 713/155 |
| 8,805,985 B2 * | 8/2014 | Monjas Llorente | .. | H04L 67/306 709/224 |
| 9,971,884 B1 * | 5/2018 | Simca | ................... | G06F 21/305 |
| 10,305,914 B1 * | 5/2019 | Brin | ...................... | H04L 9/3236 |
| 10,462,112 B1 * | 10/2019 | Makmel | .............. | H04L 63/0435 |
| 10,715,327 B1 * | 7/2020 | Ramanujan | ......... | H04L 63/0838 |
| 10,862,689 B1 * | 12/2020 | Aizikovich | ........... | H04L 9/3231 |
| 11,818,119 B1 * | 11/2023 | Dayan | .................. | H04L 63/083 |
| 11,909,731 B1 * | 2/2024 | Dayan | ................ | H04L 63/0263 |
| 2007/0174905 A1 * | 7/2007 | Martherus | ........... | H04L 63/0815 726/8 |
| 2008/0092221 A1 * | 4/2008 | Tan | ..................... | G06F 21/6218 726/10 |
| 2008/0301298 A1 * | 12/2008 | Bernardi | ................. | H04L 67/52 709/226 |

(Continued)

OTHER PUBLICATIONS

Patton (Kerberos authentication: How it works—and how to maximize its security, Jan. 3, 2022, 13 pages) (Year: 2022).*

(Continued)

*Primary Examiner* — Oleg Korsak
(74) *Attorney, Agent, or Firm* — FINNEGAN, HENDERSON, FARABOW, GARRETT & DUNNER LLP (57) ABSTRACT

Described herein are methods, systems, and computer-readable storage media for using a network identity. Techniques may include obtaining and encrypting a first data element using an encryption key and storing the encrypted first data element mapped to a network identity. Techniques may further include receiving a request from the network identity to perform an action on a resource and authenticating the network identity using an existing protocol, decrypting the first data element using a second data element calculated based on standard fields of the existing protocol, and enabling the action on the resource using the first data element.

22 Claims, 5 Drawing Sheets

(56) References Cited

U.S. PATENT DOCUMENTS

| | | | |
|---|---|---|---|
| 2009/0113533 A1* | 4/2009 | Genty | H04L 63/0281 726/7 |
| 2012/0030336 A1* | 2/2012 | Monjas Llorente | H04L 67/306 709/223 |
| 2013/0067229 A1* | 3/2013 | German | H04L 63/0846 713/171 |
| 2013/0103952 A1* | 4/2013 | Zizzi | G06F 21/6209 713/185 |
| 2013/0298209 A1* | 11/2013 | Targali | H04W 12/06 726/6 |
| 2014/0189808 A1* | 7/2014 | Mahaffey | H04L 63/083 726/4 |
| 2015/0310202 A1* | 10/2015 | Sondhi | H04L 63/0815 726/8 |
| 2016/0241389 A1* | 8/2016 | Le Saint | H04L 9/0844 |
| 2017/0111351 A1* | 4/2017 | Grajek | H04L 63/083 |
| 2017/0324758 A1* | 11/2017 | Hart | H04L 63/0428 |
| 2017/0329957 A1* | 11/2017 | Vepa | G06F 21/445 |
| 2018/0075231 A1* | 3/2018 | Subramanian | H04L 63/0807 |
| 2018/0255456 A1* | 9/2018 | Yin | H04L 63/0823 |
| 2018/0337914 A1* | 11/2018 | Mohamad Abdul | H04L 9/3213 |
| 2019/0222568 A1* | 7/2019 | Sridhar | H04L 9/14 |
| 2019/0289005 A1* | 9/2019 | Shtivi | H04L 12/4633 |
| 2019/0364020 A1* | 11/2019 | Wardell | H04W 12/062 |
| 2021/0099553 A1* | 4/2021 | Grosjean | H04L 69/162 |
| 2021/0136084 A1* | 5/2021 | Dayan | H04L 63/08 |
| 2021/0234678 A1* | 7/2021 | Armleder | H04L 9/0897 |
| 2021/0383378 A1* | 12/2021 | McCoy | G06Q 20/38215 |
| 2021/0409421 A1* | 12/2021 | Dayan | H04L 63/105 |
| 2022/0264300 A1* | 8/2022 | Nix | H04L 9/0841 |

OTHER PUBLICATIONS

Chen et al. (Report on Post-Quantum Cryptography, NISTIR 8105, Apr. 2016, 15 pages) (Year: 2016).*

* cited by examiner

AGENTLESS SINGLE SIGN-ON TECHNIQUES

TECHNICAL FIELD

This disclosure is related to agentless single sign-on techniques for network identities to access various types of resources. In some embodiments, for example, this disclosure relates to systems and methods for generating and storing data required to automatically perform actions with single sign-on when network identities access network resources.

BACKGROUND

Network identities may include users and computing devices connecting to various resources needing direct access to the resources, or a gateway to such resources. Security vulnerabilities may arise, however, when an identity attempts to impersonate a trusted identity on behalf of a network identity to obtain access to resources. In some situations, for example, network identities can attempt to obtain access to resources using techniques such as port forwarding. Such impersonation techniques result in a single point of failure in a network. These vulnerabilities are magnified when a compromised gateway obtains the ability to impersonate network identities. This creates a high-risk scenario where an attacker can impersonate any user or device and access any resource. Port forwarding techniques do not necessarily cause a single point of failure but do need a setup to forward data for each user or device from an internal port of an execution environment to an external port on a resource. Port forwarding techniques may also require tracking all mappings between internal and external ports. Further, impersonation and port forwarding techniques are limited to accessing trusted resources but cannot perform additional actions, for example logging certain activities or files on a resource.

According to the techniques described herein, secure access to resources over a network by network identities can be achieved via a gateway utilizing data packets of existing communication protocols to include additional information related to actions to perform on trusted resources, including authentication. Further, such additional information shared between network identities and a gateway can be secured using encryption technologies.

Thus, in view of these types of network vulnerabilities, there is a need for technological solutions to manage network identities' access to resources that are secure, do not require a complex setup, or expose a single point of failure. Such solutions will advantageously, as described herein, help avoid high-risk single points of failure, limited port forwarding functionality, or the cost of customization of remote access protocols.

Furthermore, there are technological needs to have simple techniques, as discussed below, to access resources that both allow various actions to be performed on resources and do not require any complex customization. Also, such solutions should be easily adaptable to include new communication protocols, new network identities, and new resources. Further technical improvements are described in the example embodiments below.

SUMMARY

Certain embodiments of the present disclosure relate to a non-transitory computer readable medium including instructions that are executable by at least one processor to perform operations when using a network identity. The operations may include obtaining a first data element, encrypting the first data element using an encryption key, storing the encrypted first data element, wherein the encrypted first data element is mapped to a network identity, receiving a request from the network identity to perform an action on a resource, authenticating the network identity using an existing protocol, decrypting the first data element using a second data element calculated based on standard fields of the existing protocol, and enabling the action on the resource using the first data element.

According to some disclosed embodiments, encrypting the first data element using the encryption key further comprises encrypting the first data element using a data key, and encrypting the data key using the encryption key.

According to some disclosed embodiments, storing the encrypted first data element includes storing the encrypted first data element and the encrypted data key.

According to some disclosed embodiments, the encrypted first data element is mapped to the network identity, wherein the mapping includes mapping the stored encrypted first data element and the encrypted data key to the network identity.

According to some disclosed embodiments, decrypting the first data element of the network identity occurs as part of an authentication of the network identity.

According to some disclosed embodiments, the decrypted first data element cannot be calculated by the network identity.

According to some disclosed embodiments, the operations may further comprise calculating the second data element by the network identity.

According to some disclosed embodiments, enabling the action may further comprise determining the action based on first data element, and enabling the determined action.

According to some disclosed embodiments, the first data element is at least one of: a token, a secret, a text, or a file.

According to some disclosed embodiments, the existing protocol is at least one of: RDP, SSH, Password Authentication Protocol (PAP). Challenge Handshake Authentication Protocol (CHAP), Extensible Authentication Protocol (EAP), AKA, Basic Access Authentication. CAVE-based Authentication, CRAM-MD5. Digest, Host Identity Protocol (HIP), NTLM, Kerberos, OpenID, Radius, SMAL, OAuth2, LDAP, SRP, RFID-Authentication Protocols, Woo Lam 92, HTTPS, or TLS.

According to some disclosed embodiments, the standard fields are fields of an extension of the existing protocol.

According to some disclosed embodiments, the standard fields include only one field.

According to some disclosed embodiments, the standard fields include a nonce and a response to the nonce by the existing protocol.

According to some disclosed embodiments, the standard fields include an RDP license of a network identity.

According to some disclosed embodiments, using the standard fields does not affect performance or security of the existing protocol.

According to some disclosed embodiments, authenticating the network identity includes a multi-factor authentication.

According to some disclosed embodiments, the standard fields include one or more factors of the multi-factor authentication.

According to some disclosed embodiments, authenticating the network identity includes use of a post-quantum public key cryptography.

According to some disclosed embodiments, the second data element can be calculated only by cooperation of the network identity and the resource.

According to some disclosed embodiments, the encrypted first data element is stored in the resource or another resource.

Certain embodiments of the present disclosure relate to a computer implemented method when using a network identity. The method may include obtaining a first data element, encrypting the first data element using an encryption key, storing the encrypted first data element, wherein the encrypted first data element is mapped to a network identity, receiving a request from the network identity to perform an action on a resource, authenticating the network identity using an existing protocol, decrypting the first data element using a second data element calculated based on standard fields of the existing protocol, and enabling the action on the resource using the first data element.

Certain embodiments of the present disclosure relate to an authentication system. The authentication system may include one or more memory devices storing processor-executable instructions, and one or more processors configured to execute instructions to cause the authentication system to perform operations. The operations may include obtaining a first data element, encrypting the first data element using an encryption key, storing the encrypted first data element, wherein the encrypted first data element is mapped to a network identity, receiving a request from the network identity to perform an action on a resource, authenticating the network identity using an existing protocol, decrypting the first data element using a second data element calculated based on standard fields of the existing protocol, and enabling the action on the resource using the first data element.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof may occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms, thus, cover both active forms, and passive forms, of sending and receiving.

Systems and methods consistent with the present disclosure are directed to secure and adaptable agentless access to resources to perform actions. Systems and methods described below include techniques of utilizing a gateway to manage data required to access resources to perform actions requested by network identities. In some embodiments, the disclosed techniques can include securing data using encryption techniques. As described below, secured data passed as part of communication packets using existing protocols can result in various technological improvements to perform authentication and other actions in an agentless manner on an underlying system, hardware, and software, and other applications.

Figure 1:
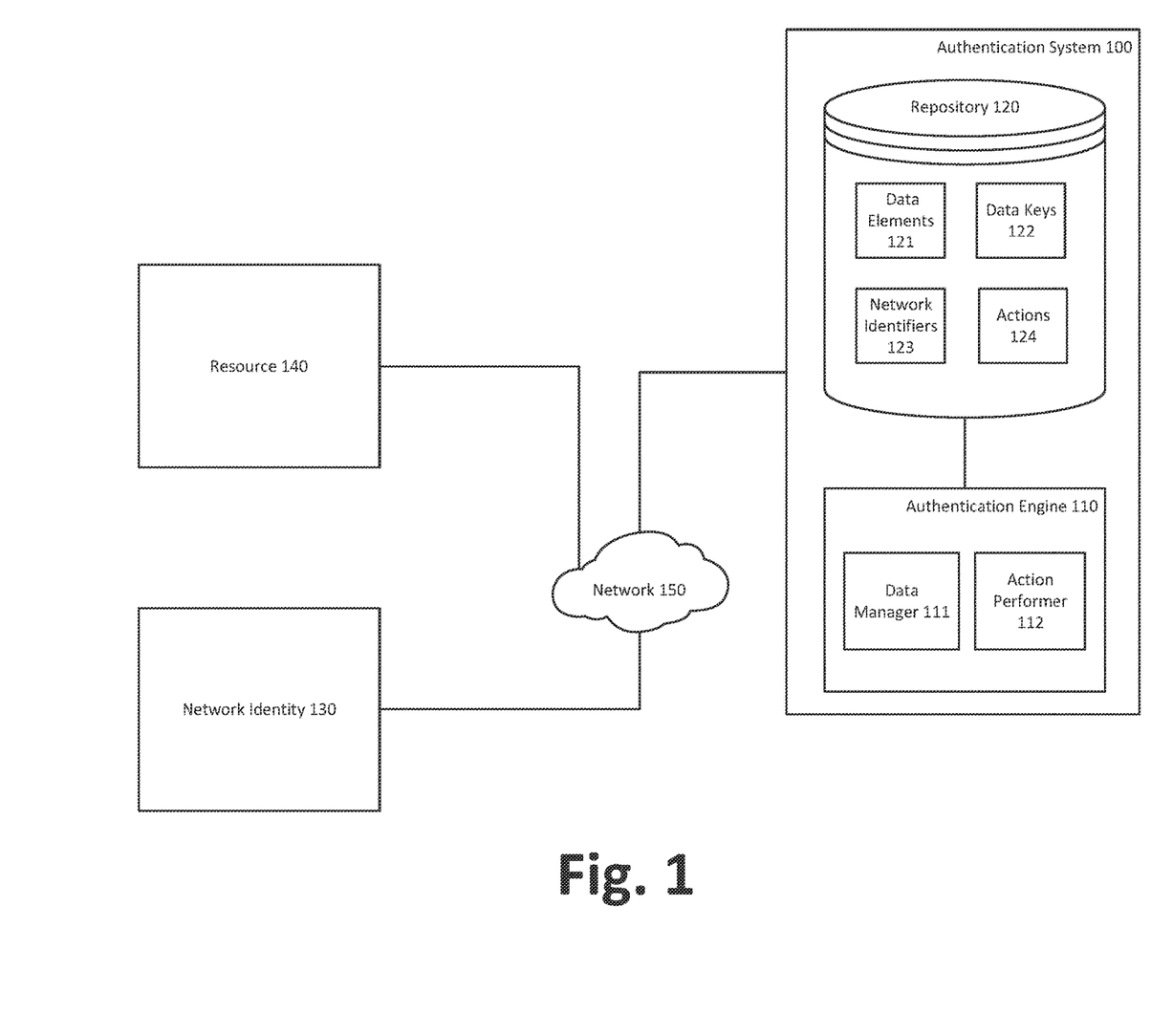
FIG. 1 is a block diagram showing various exemplary components of an authentication system, according to some embodiments of the present disclosure.

FIG. 1 is a block diagram showing various exemplary components of authentication system 100 for performing actions automatically on network resources, according to some embodiments of the present disclosure. Authentication system 100 components may comprise authentication engine 110 and repository 120 to help manage data required for performing actions on resource 140 as requested by network identity 130. Authentication engine 110 may generate and manage data needed for performing actions on resource 140. Repository 120 may include various data and identifiers to identify and access appropriate data needed to perform actions 124 on resource 140.

Authentication system 100 may perform actions immediately upon successful operations or after a period of time. For example, authentication system 100 may provide additional licensing information for an action to verify a license as part of authentication to access a resource (e.g., resource 140). In some embodiments, authentication system 100 may perform an action once or repeatedly when accessing a resource during a session. In some embodiments, authentication system 100 may allow the configuration of a time period for recurring actions at a fixed period, occurring at regular time intervals, or a dynamic period based on a trigger event. For example, authentication system 100 may be configured to perform an action dynamically when accessing certain resources or when a certain user or device is accessing a resource. Authentication system 100 may use repository 120 to store actions to perform and other configuration details for authentication engine 110 to perform the stored actions based on the parsed configuration details. Authentication system 100 utilizes authentication engine 110 and repository 120 to provide the ability to configure and store configured settings for performing actions repeatedly.

As illustrated in FIG. 1, authentication engine 110 may include data manager 111 and action performer 112 to manage data needed to perform actions and execute code related to actions. Repository 120 may include data elements 121 generated and encrypted by data manager 111 to perform actions. Repository 120 may also include data keys 122 to handle secure storage of data elements 121 and retrieval of decrypted data elements 121. Data keys 122 may include other keys as part of data keys 122 to encrypt some of data keys 122. Repository 120 may also include network identifiers 123 of various network identities, including network identity 130 associated with data elements 121. Repository 120 may also include actions 124, defining the type and time of execution of an action of actions 124 on behalf of a network identity (e.g., network identity 130) on a resource (e.g., resource 140).

Authentication engine 110 may aid in the generation of data elements needed for performing actions 124 on resource 140. Network identity 130 may initiate the generation of data elements 121 by authenticating with authentication engine 110. Authentication engine 110 may receive data elements 121 required for performing actions 124 as part of data sent by network identity 130. In some embodiments, authentication engine 110 may request data elements (e.g., data elements 121) from a third party based on an authentication request transmitted by network identity 130. For example, network identity 130 may authenticate with authentication engine 110 and cause authentication engine 110 to generate a token for authenticating network identity 130 with various resources (e.g., resource 140). A detailed description of the generation of data elements is described in detail in connection with FIG. 2A below.

Data manager 111 may manage data required for performing actions 124 on resource 140. Data managed by data manager 111 may include, for example, data input to actions 124, configurations of actions 124, or software code details to perform actions 124. Data manager 111 may receive data as part of the authentication of network identity 130 with authentication system 100.

Authentication of network identity 130 may include a user identity authentication on a device or device identity requesting a connection and access to resource 140. Network identity 130 may share data for performing an action as part of a communication protocol data packet transmitted between network identity 130 and authentication engine 110. For example, network identity 130 authenticating over secure shell (SSH) may share data relevant to performing actions in various fields present in data packets transmitted as part of a handshake to authenticate network identity 130 by authentication system 100. An example handshake of an SSH authentication using the Transmission Control Protocol (TCP) protocol with data related to actions is presented in detail in connection with FIGS. 2A-B below. In some embodiments, information transmitted by network identity 130 as part of an authentication may include details of the type of action and timing to perform the configured action.

Data manager 111 may retrieve information related to input data and configuration details of an action of actions 124 and stored in repository 120 as data elements 121. Data manager 111 may securely store input data in data elements 121 using encryption techniques. Data manager 111 may generate encryption keys (e.g., data keys 122) used to encrypt input data for actions transmitted by network identity 130 to store as data elements 121. In some embodiments, data manager 111 may receive encryption keys from a third-party service over network 150. Data manager 111 may store encrypted information related to input data and configuration details of an action as data elements 121. In some embodiments, data manager 111 may also encrypt keys used to encrypt data elements 121 and store them in data keys 122.

Data manager 111 may review data transmitted as part of a communication using existing communication and authentication protocols (e.g., SSH protocol, or others) and review various fields of data structures supplied as part of transmitted and received data. Data manager 111 may utilize software libraries associated with existing protocols. Data manager 111 may identify and retrieve different types of data from data transmitted by network identity to authentication system 100 at different times. For example, network identity 130 communicating with authentication system 100 using the SSH protocol may transmit different data to perform actions as part of the initial authentication request and later transmission of other commands. In some embodiments, data manager 111 may use data transmitted by network identity 130 to configure when and which fields to review to retrieve data in the future to perform requested actions. For example, network identity 130 may transmit configuration data related to an action of actions 124 to authentication system 100 as part of the initial handshake to authenticate network identity 130 and the actual data used to perform an action of actions 124 on resource 140 in later commands sent using the SSH protocol.

Action performer 112 may perform actions as requested by network identity 130. For example, action performer 112 may retrieve data keys of data keys 122 and data from data elements 121 to perform an action of actions 124. Action performer 112 may also, for example, refer to an index for retrieving relevant data keys of data keys 122, data elements of data elements 121, and actions 124. Of course, in other embodiments, action performer 112 may be coded and configured to perform other actions as well.

Action performer 112 may perform actions 124 on resource 140 based on the latest data at authentication system 100 from network identity 130 over network 150. In some embodiments, data transmitted from network identity 130 may include a mapping of data keys of data keys 122 to use with data elements of data elements 121 to decrypt and use them with an action of actions 124 to perform on resource 140. In some embodiments, data elements 121 may include configuration details to trigger action performer 112 to perform an action of actions 124. In some embodiments, data transmitted by network identity 130 may include a link to an action of actions 124 to perform on resource 140.

Action performer 112 may retrieve relevant data keys of data keys 122 to decrypt and access data elements of data elements 121 to use with an action of actions 124. In some embodiments, action performer 112 may receive a relevant decryption key to decrypt data elements of data elements 121 used to perform an action on resource 140. In some embodiments, a decryption key received as data from network identity 130 may decrypt an encrypted data key of data keys 122 to use to decrypt a data element of data elements 121.

Authentication engine 110 may utilize its components described above with various components of repository 120 to generate and manage resource 140 accessed by network identity 130. In various embodiments, repository 120 may take several different forms. For example, repository 120 may be an SQL database or NoSQL database, such as those developed by MICROSOFT™, REDIS, ORACLE™, CASSANDRA, MYSQL, or various other types of databases. According to such database techniques, data may be returned by calling a web service, by calling a computational function, from sensors, from IoT devices, or from various other data sources. Repository 120 may store data that is used or generated during the operation of applications, such as authentication engine 110 or its components. For example, if authentication engine 110 is configured to generate data to use to perform actions, such as data elements 121, repository 120 may store the generated data used to perform actions 124 in data elements 121, and encryption keys used to encrypt data elements 121 in data keys 122.

Similarly, if authentication engine 110 is configured to provide a previously generated or retrieved data element of data elements 121, authentication engine 110 may retrieve previously generated data keys (e.g., data keys 122) associated with data elements 121 in repository 120 to decrypt data elements 121. In some embodiments, repository 120 may be fed data from an external source, or the external source (e.g., server, database, sensors, IoT devices, etc.) may be a replacement. An external source may connect to repository 120 over a network (e.g., network 150).

Data elements 121 and data keys 122 may be provided by authentication engine 110 to store in repository 120. In some embodiments, data elements 121 and data keys 122 may be provided directly by a third-party software service or hardware. Repository 120 may maintain relationships between data elements 121 and data keys 122. The relations may describe which data key of data keys 122 may be used by authentication system (100 to encrypt and decrypt data elements 121 for secure storage of a data element. Data elements 121 and data keys 122 may be calculated using the data provided by network identity 130 in fields of data structures transmitted to authentication system 100 as part of communication packets of a chosen communication protocol. Authentication system 100 may manage data elements 121 to aid in a process of single sign-on of network identity 130 on different resources (e.g., resource 140), as described further herein.

Repository 120 may also include information about network identities (e.g., network identity 130) and resources (e.g., resource 140) that connect, perform, and track actions and share results of actions in network identifiers 123. Network identifiers 123 may include a hash map that may map between network identity 130 and the data keys 122 to identify the appropriate data key to decrypt a data element of data elements 121. In some embodiments, network identifiers 123 may map directly to data elements 121 to identify data elements of data elements 121 to use for performing actions of actions 124 on resource 140. In some embodiments, network identifiers 123 may also include mappings to actions 124 to determine which actions to perform on resource 140. Network identifiers 123 may map a network identifier to multiple data elements 121, data keys 122, and actions 124 using various data structures. Network identifiers 123 may map to a hierarchical data structure, such as JSON or other formats, to present relationships between various data elements of data elements 121 supplied to different actions of actions 124 to be performed on resource 140. For example, network identity 130 may require two different actions to log disk and network usage statistics on resource 140 and provide data elements 121 to define times to log disk and network usage statistics.

Repository 120 may also include descriptions of actions performed on resource 140 as actions 124. Authentication system 100 may access actions 124 to coordinate performance actions on resource 140 using data elements 121 identified by actions 124. Actions 124 may include files with configuration details of when to perform actions. For example, actions 124 configuration details may include what time intervals and what trigger events cause the performance of an action. Actions 124 may also include information about input data elements of data elements 121 and output file locations also represented by data elements 121.

Network identity 130 may be a network identity representing a human or a machine. In some embodiments, network identity 130 may be a human identity operating on a machine identity. A human identity may be represented by, for example, a user account on an operating system, a computing device, or an application. In some embodiments, a machine identity in the form of an application or service running on a computing instance or computing instance may be network identity 130. A list of various network identities utilizing authentication system 100 may be included in network identifiers 123. Network identity 130 may request access to resource 140 to perform actions 124 on resource 140. Actions 124 may include authentication of network identity 130 to access resource 140. Authentication system 100 may perform or facilitate single sign-on by network identity 130 to access various resources by using data elements 121. For example, authentication system 100 may supply tokens in data elements 121 for authenticating network identity 130 to access resource 140.

Resource 140 may be a software or hardware entity with the ability to connect and communicate with network identity 130. For example, resource 140 may be a software service accessible over network 150 to a user or a device represented by network identity 130. In some embodiments, resource 140 may be another network identity accessed by network identity 130.

Network 150 may take various forms. For example, the network 150 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network 150 may include an on-premises (e.g., LAN) network, while in other embodiments, network 150 may include a virtualized (e.g., AWS™, Azure™, IBM Cloud™, etc.) network. Further, network 150 may in some embodiments, be a hybrid on-premises or fully virtualized network, including components of both types of network architecture.

Figure 2A:
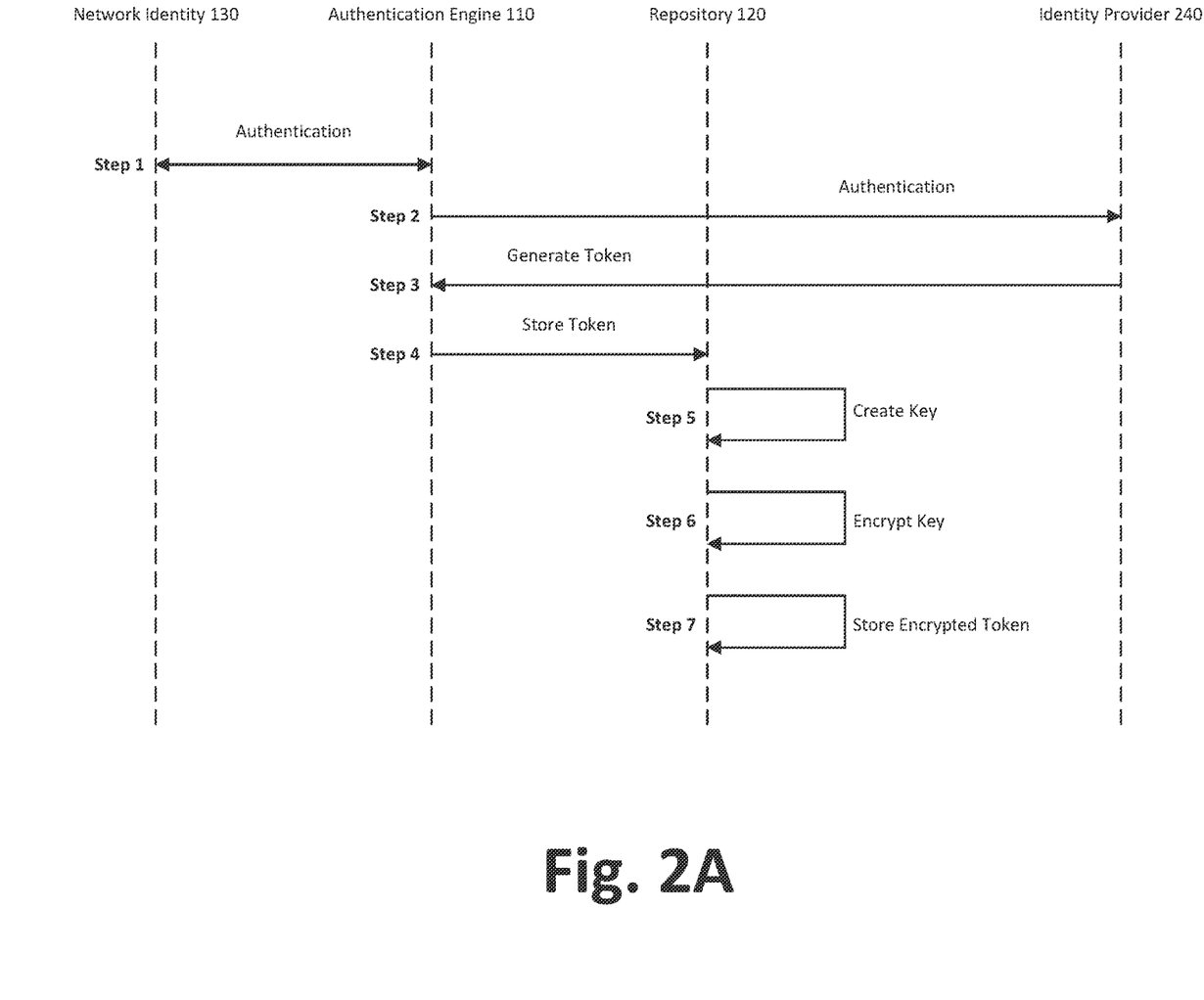
FIG. 2A shows an exemplary generation of data elements, according to some embodiments of the present disclosure.
Figure 2B:
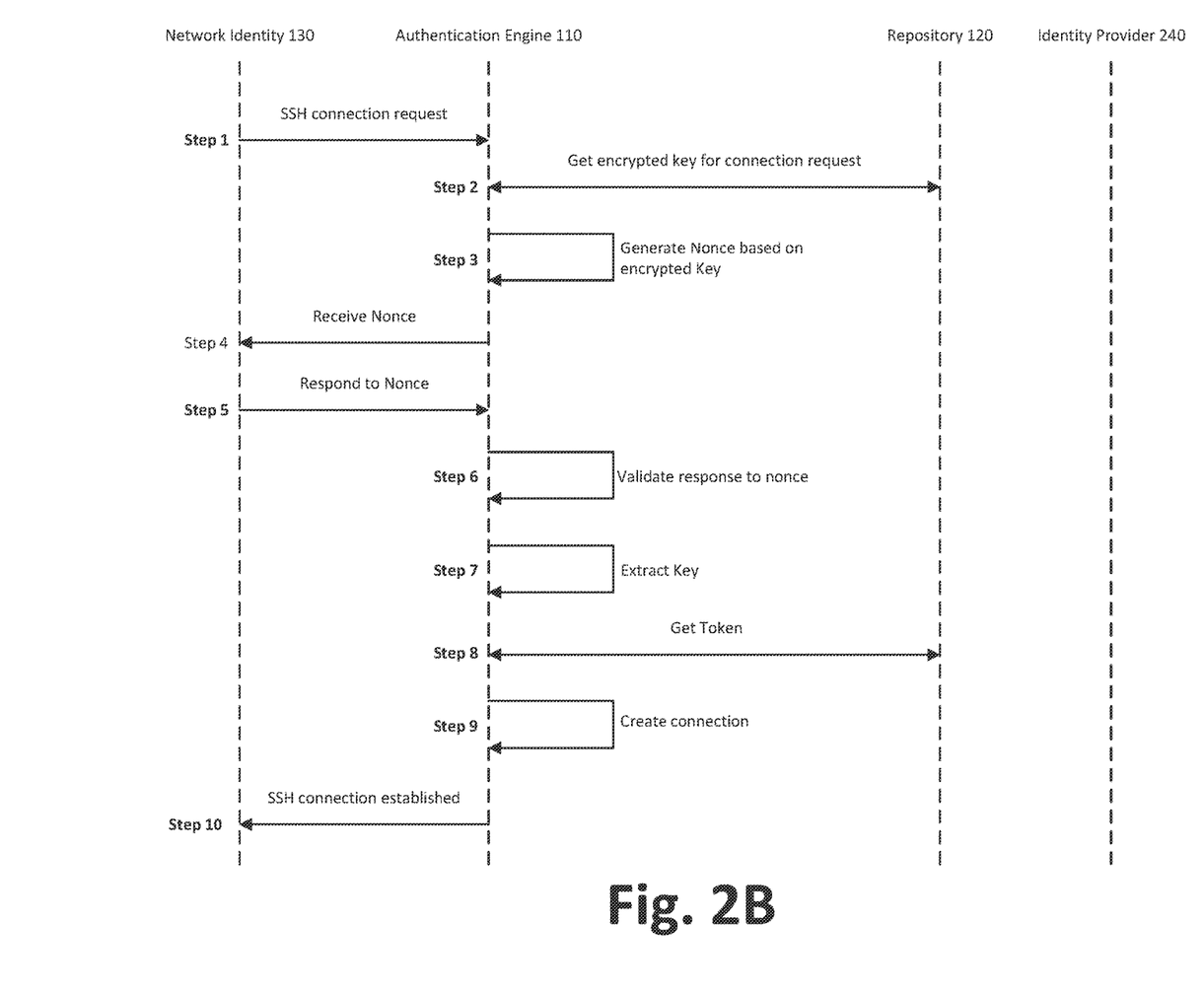
FIG. 2B shows an exemplary usage of data elements, according to some embodiments of the present disclosure.

FIGS. 2A-B are exemplary illustrations of the generation and usage of data elements 121 for establishing SSH connections, consistent with embodiments of the present disclosure. As illustrated in FIG. 2A, and performed by for example data manager 111, the process may help generate and store a token in data elements 121 to authenticate network identity 130 to connect with resource 140. Network identity 130 may request an SSH connection action, for instance, by authenticating with authentication system 100.

In step 1, network identity 130 authenticates with authentication engine 110 to help make a request to generate data elements (e.g., data elements 121 of FIG. 1) for performing actions (e.g., actions 124 of FIG. 1).

In step 2, authentication engine 110 may forward an authentication request from network identity 130 to a third-party identity provider 240 to help generate data elements. Authentication engine 110 may forward the complete authentication request received in step 1 or partial information identifying network identity 130, such as IP address, MAC address, or user account name, etc.

In step 3, identity provider 240 may transmit a token as a data element to authentication engine 110 to associate with network identity 130. In some embodiments, identity provider 240 may generate and transmit a new token as a data element of data elements 121 for every request from network identity 130.

In step 4, authentication engine 110 may request repository 120 to store the token received in step 3 in data elements 121. Data manager 111 of authentication engine 110 may make a request for storing the token.

In step 5, repository 120 may secure (e.g., encrypt) the received data element using data keys 122. Repository 120 may generate a key to use with the token from step 3. Repository 120 may store the generated key in data keys 122 (as shown in FIG. 1).

In step 6, repository 120 may encrypt the key generated in step 5 using a public key related to network identity 130. Authentication system 100 may generate public key related to network identity 130.

In step 7, repository 120 may encrypt the token using the key from step 5 and store the encrypted token in data elements 121. Repository 120 may store the encrypted key from step 6 in data keys 122. Repository 120 may also create a mapping between an identifier of the token from step 3 and the encrypted token, and store it in data elements 121. In some embodiments, repository 120 may also create a mapping between an identifier of the token and the encrypted key from step 6, and store it in data keys 122. A token identifier may include an identifier of the network identity 130, such as IP address of an operating system, MAC address of network interface (e.g., Network interface 318 of FIG. 3), or user account representing network identity 130, etc. Authentication system 100 may use stored tokens as data elements 121 and encrypted keys as data keys 122 to perform actions. A detailed description of the use of tokens in data elements 121 to perform actions (e.g., actions 124 of FIG. 1) on resource 140 is provided in connection with FIG. 2B below.

FIG. 2B shows an exemplary usage of data elements, according to some embodiments of the present disclosure. As illustrated in FIG. 2B, authentication engine 110 may use previously generated tokens and keys to perform actions (e.g., actions 124 of FIG. 1) on resource 140.

In step 1, network identity 130 may send an SSH connection request as an action to authentication engine 110 to connect with resource 140 (as shown in FIG. 1). In some embodiments, additional actions to perform on resource 140 may be included in the SSH connection request sent by network identity 130. For example, the SSH connection request may include logging actions for network usage and disk usage, among other potential actions.

In step 2, authentication engine 110 may retrieve the encrypted key in data keys 122 (as shown in FIG. 1) from repository 120 generated as per the steps described in connection with FIG. 2A above.

In steps 3-7, authentication engine 110 may confirm network identity 130 before retrieving the relevant key in data keys 122 (as shown in FIG. 1) to decrypt the token in data elements 121 (as shown in FIG. 1) to establish the requested SSH connection from step 1. In step 3, the process may prepare a nonce to validate network identity 130 before extracting the stored token in data elements 121. Authentication engine 110 may generate the nonce by generating a random number and providing it as an input parameter along with the encrypted key from step 2 and the public key of network identity 130 to a nonce generation library function.

In step 4, authentication engine 110 may transmit the nonce from step 3 to network identity 130 over a standard communication protocol, such as SSH, RDP, etc.

In step 5, network identity 130 may decrypt the nonce using a private key related to the public key in step 3. Network identity 130 may transmit the decrypted nonce to authentication engine 110.

In step 6, authentication engine 110 may validate the response from step 5 by comparing it to the nonce generated in step 3.

In step 7, authentication engine 110 may retrieve the key from the encrypted key of step 2 using the nonce from step 5. The response nonce from step 5 may include the decryption key needed to decrypt the key encrypted using the public key. By limiting access to the key to only through a response to nonce generated by network identity 130, authentication engine 110 of authentication system 100 needs network identity 130 to establish a connection and cannot impersonate an identity on its own. Such a setup avoids a single point of failure and the risk of impersonating any user with access to tokens representing various network identities. Authentication system 100 may generate nonce for which network identity 130 may generate a response.

In step 8, authentication engine 110 retrieves the token in data elements 121 by looking based on network identity 130 and decrypting using the key from step 7.

In step 9, authentication engine 110 may use the token to generate an SSH connection. Authentication engine 110 may generate the SSH connection to resource 140. The SSH connection may include an action requested by network identity 130 to perform on resource 140.

In step 9, network identity 130 may receive a confirmation of an established SSH connection based on the connection request in step 1. Network identity 130 may then be able to conduct actions such as sign sign-on by sharing data needed to set up connections using tokens and validating keys used to retrieve tokens.

Figure 3:
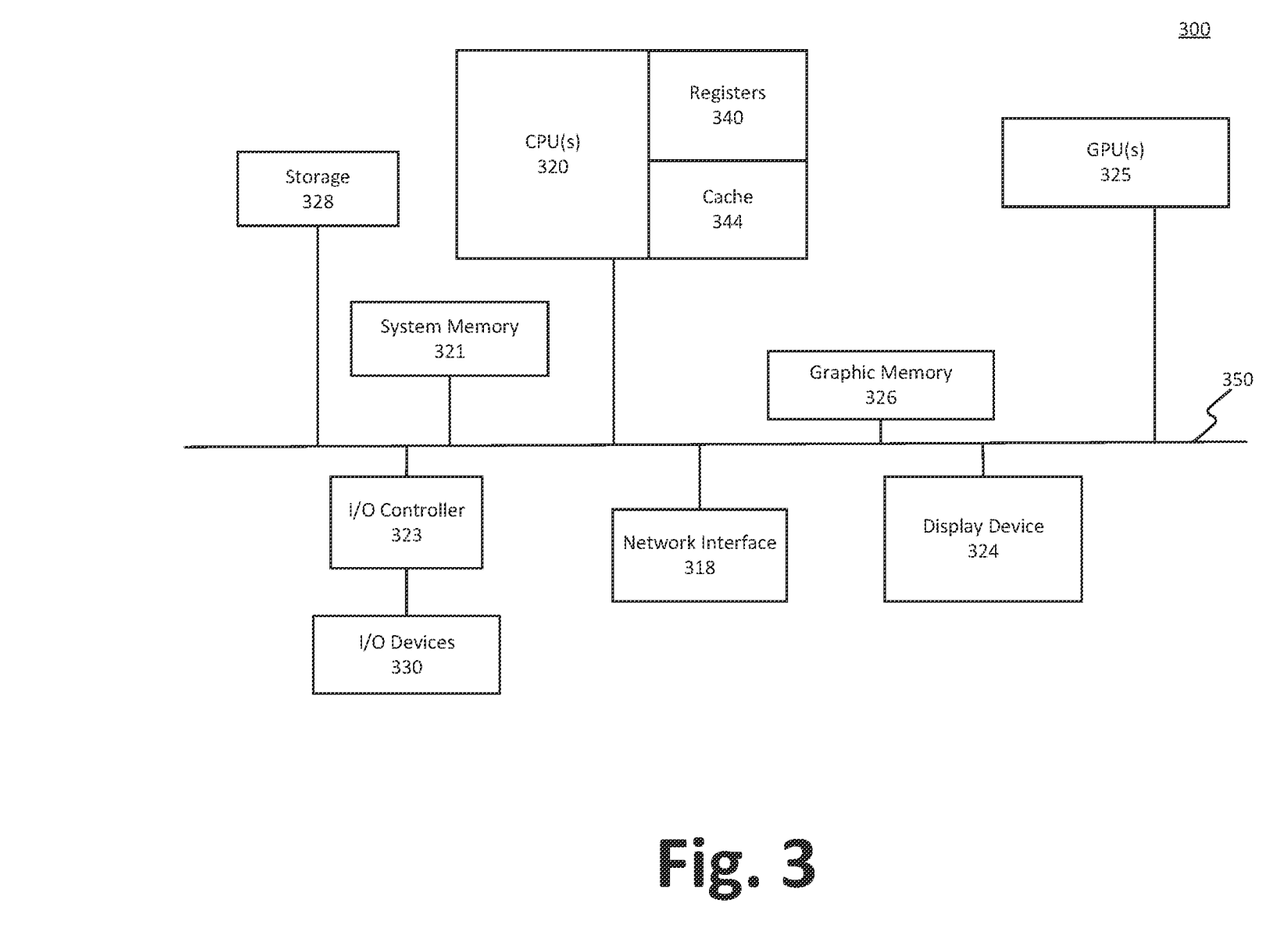
FIG. 3 is a block diagram of an exemplary computing device used to implement a code execution management system of FIG. 1, according to some embodiments of the present disclosure.

FIG. 3 is a block diagram of an exemplary computing device 3M), consistent with embodiments of the present disclosure. In some embodiments, computing device 300 may be a specialized server or other computing resource providing the functionality described herein. In some embodiments, components of authentication system 100, such as authentication engine 110 and repository 120 of FIG. 1, may be implemented using the computing device 300 or multiple computing devices 300 operating in parallel. Further, the computing device 300 may be a second device providing the functionality described herein or receiving information from a server to provide at least some of the described functionality. Moreover, the computing device 300 may be an additional device or devices that store or provide data consistent with embodiments of the present disclosure and, in some embodiments, computing device 300 may be a virtualized computing device such as a virtual machine, multiple virtual machines, or a hypervisor.

Computing device 300 may include one or more central processing units (CPUs) 320 and a system memory 321. Computing device 300 may also include one or more graphics processing units (GPUs) 325 and graphic memory 326. In some embodiments, computing device 300 may be a headless computing device that does not include GPU(s) 325 or graphic memory 326.

CPUs 320 may be single or multiple microprocessors, field-programmable gate arrays, or digital signal processors capable of executing sets of instructions stored in a memory (e.g., system memory 321), a cache (e.g., cache 341), or a register (e.g., one of registers 340). CPUs 320 may contain one or more registers (e.g., registers 340) for storing various types of data including, inter alia, data, instructions, floating-point values, conditional values, memory addresses for locations in memory (e.g., system memory 321 or graphic memory 326), pointers and counters. CPU registers 340 may include special-purpose registers used to store data associated with executing instructions such as an instruction pointer, an instruction counter, or a memory stack pointer. System memory 321 may include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 321 may be one or more memory chips capable of storing data and allowing direct access by CPUs 320. System memory 321 may be any type of random-access memory (RAM), or other available memory chip capable of operating as described herein.

CPUs 320 may communicate with system memory 321 via a system interface 350, sometimes referred to as a bus. In embodiments CPUs 320 may include GPUs 325, and GPUs 325 may be any type of specialized circuitry that may manipulate and alter memory (e.g., graphic memory 326) to provide or accelerate the creation of images. GPUs 325 may have a highly parallel structure optimized for processing large, parallel blocks of graphical data more efficiently than general-purpose CPUs 320. Furthermore, the functionality of GPUs 325 may be included in a chipset of a special purpose processing unit or a co-processor.

CPUs 320 may execute programming instructions stored in system memory 321 or other memory, operate on data stored in memory (e.g., system memory 321), and communicate with GPUs 325 through the system interface 350, which bridges communication between the various components of the computing device 300. In some embodiments, CPUs 320. GPUs 325, system interface 350, or any combination thereof, may be integrated into a single chipset or processing unit. GPUs 325 may execute sets of instructions stored in memory (e.g., system memory 321), to manipulate graphical data stored in system memory 321 or graphic memory 326. For example, CPUs 320 may provide instructions to GPUs 325, and GPUs 325 may process the instructions to render graphics data stored in the graphic memory 326. Graphic memory 326 may be any memory space accessible by GPUs 325, including local memory, system memory, on-chip memories, and hard disk. GPUs 325 may enable displaying of graphical data stored in graphic memory 326 on display device 324 or may process graphical information and provide that information to connected devices through network interface 318 or I/O devices 330.

Computing device 300 may include a display device 324 and input/output (I/O) devices 330 (e.g., a keyboard, a mouse, or a pointing device) connected to I/O controller 323. I/O controller 323 may communicate with the other components of computing device 300 via system interface 350. It should now be appreciated that CPUs 320 may also communicate with system memory 321 and other devices in manners other than through system interface 350, such as through serial communication or direct point-to-point communication. Similarly, GPUs 325 may communicate with graphic memory 326 and other devices in ways other than system interface 350. In addition to receiving input, CPUs 320 may provide output via I/O devices 330 (e.g., through a printer, speakers, bone conduction, or other output devices).

Furthermore, the computing device 300 may include a network interface 318 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 318 may comprise a built-in network adapter, network interface card, PCMCIA network card, card bus network adapter, wireless network adapter. USB network adapter, modem, or any other device suitable for interfacing the computing device 300 to any type of network capable of communication and performing the operations described herein.

Figure 4:
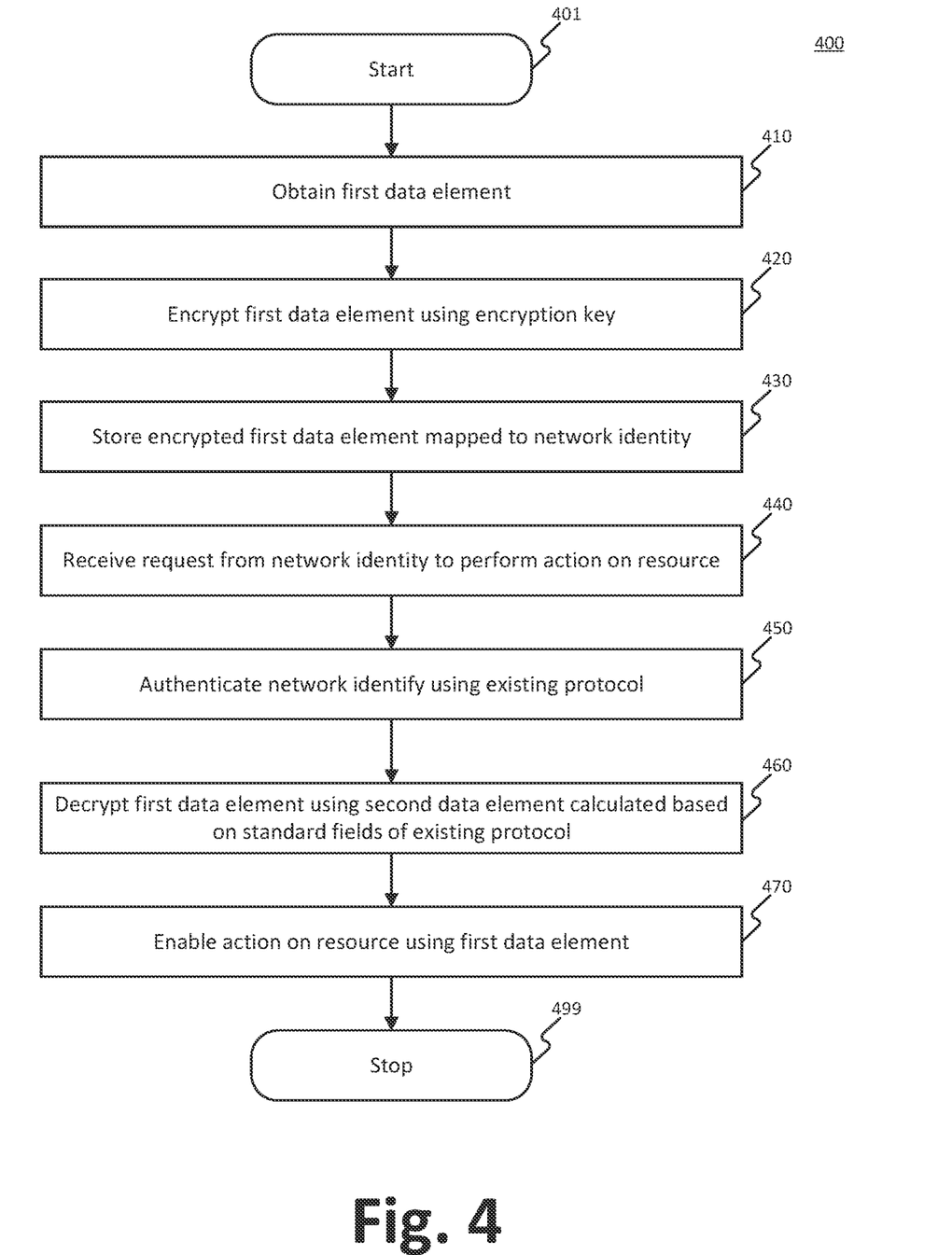
FIG. 4 is a flowchart depicting operations of an exemplary method of performing operations when using a network identity, according to some embodiments of present disclosure.

FIG. 4 is a flowchart depicting operations of an exemplary method 400 when using network identity 130, according to some embodiments of present disclosure. The steps of method 400 may be performed by, for example, authentication system 100 of FIG. 1 executing on or otherwise using the features of computing device 300 of FIG. 3 for purposes of illustration. It will be appreciated that the exemplary method 400 may be altered to modify the order of steps and to include additional steps.

Process 400 may begin in a step 401. Step 401 may occur on demand, periodically, or as needed based on requests to access secure network resources. In step 410, authentication system 100 may obtain the first data element. The first data element may include a token, a secret, a text, or a file. For example, the first data element may be a token generated in step 3 of FIG. 2A described above to aid in establishing SSH connections on behalf of network identity 130 (as shown in FIG. 1). In some embodiments, the first data element may be a text element representing a path to a file. The file may include a script to be executed on resource 140 (as shown in FIG. 1) or retrieve and transform data from resource 140. In some embodiments, network identity 130 may offer the first data element of data elements 121 (as shown in FIG. 1).

Authentication system 100 may obtain the first data element from network identity 130 when network identity 130 provides authentication information. For example, authentication engine 110 of authentication system 100 obtains a token from identity provider 240 (as shown in FIG. 2A) upon receiving an authentication request as described in FIG. 2A description above. Authentication system 100 may review data packets received over network 150 (as shown in FIG. 1) to retrieve the first data element. Authentication system 100 may retrieve the first data element from standard fields of an existing protocol (e.g., SSH, RDP, etc.) used for communication by network identity 130 for authentication with authentication system 100.

In step 420, authentication system 100 may encrypt the first data element using a key. Authentication system 100 may encrypt the first data element using the data key obtained from a database (e.g., data keys 122 in repository 120 of FIG. 1) and then encrypt the data key using another encryption key. For example, the data key may be encrypted using a public key associated with network identity 130, as described in step 6 of FIG. 2A description above. Authentication system 100 may then map the encrypted first data element and the encrypted data key to network identity 130 and store the mapping in repository 120.

In step 430, authentication system 100 may store the encrypted first data element mapped to network identity 130 in repository 120. In some embodiments, authentication system 100 may store the encrypted data key from step 420 along with the encrypted first data element in data keys 122 and data elements 121. In some embodiments, the encrypted data element and the encrypted data key may be stored in a resource (e.g., resource 140 of FIG. 1) where data element contents may be utilized. For example, an encrypted data element used for logging activity on resource 140 may be stored in resource 140. In some embodiments, authentication system 100 may store the encrypted first data element in another resource other than repository 120.

In step 440, authentication system 100 may receive a request from network identity 130 to perform an action (e.g., actions 124 of FIG. 1) on resource 140. In some embodiments, authentication system 100 may determine an action based on the first data element received in step 410. For example, network identity 130 may transmit a data element (of data elements 121) with a description of an action, such as a path to a code to execute on resource 140. In some embodiments, authentication system 100 may receive an authentication request from network identity to authenticate with resource 140 that may include a request to perform an action on resource 140. In some embodiments, authentication system 100 may receive an action request by retrieving action of actions 124 (as shown in FIG. 1) upon receiving an authentication request. In some embodiments, network identity 130 may include the name of an action to perform on resource 140 in a field of a data structure transmitted as part of a communication protocol used by network identity 130 to communicate with authentication system 100.

In step 450, authentication system 100 may authenticate network identity 130 using existing communication protocols. Existing protocols may be one of, for instance, RDP, SSH, Password Authentication Protocol (PAP), Challenge Handshake Authentication Protocol (CHAP), Extensible Authentication Protocol (EAP), AKA, Basic Access Authentication, CAVE-based Authentication, CRAM-MD5, Digest, Host Identity Protocol (HIP), NTLM, Kerberos, OpenID, Radius, SMAL, OAuth2, LDAP, SRP, RFID-Authentication Protocols, Woo Lam 92, HTTPS, or TLS, etc. Authentication system 100 executing on computing device 300 may have preinstalled libraries related to existing communication protocols In step 460, authentication system 100 may decrypt the first data element using the second data element calculated based on the standard fields of an existing protocol. For example, the second data element may be the nonce generated in step 3 of FIG. 2B to validate the identity of network identity 130 requesting to perform an action.

The standard fields may be attributes included in packages used by an existing protocol. In some embodiments, the standard fields may be included as part of an extension of an existing protocol. The number of standard fields may vary depending on the type of protocol chosen for communication by network identity 130. In some embodiments, the standard fields may include a value used by an existing protocol as part of communication content. For example, the standard fields may include a nonce used as a response to nonce by an existing protocol. In some embodiments, the standard fields may include values used to represent attributes of network identity 130. For example, an existing protocol such as RDP may include a license of network identity 130 in the standard fields. The standard fields used by network identity 130 may not affect the performance or security of an existing protocol.

In some embodiments, network identity 130 may authenticate with authentication system 100 using multi-factor authentication, and the standard fields may include one or more factors of multi-factor authentication. In some embodiments, authentication system 100 may decrypt the first data element immediately as part of authentication in step 450. In some embodiments, authentication system 100 may wait for a trigger event post-authentication to decrypt the first data element. Authentication system 100 may decrypt the first data element multiple times for each trigger event. Trigger events may be automatic such as a set time period, or may be configured using a configuration setting provided as input along with the first data element and stored as data elements 121.

Network identity 130 requesting decryption of the first data element may not generate it on its own and may require it to be supplied by authentication system 100. Network identity 130 may calculate the second data element using the first data element. In some embodiments, network identity 130 may request resource 140 to help calculate the second data element. The second data element may be a decrypted version of the first data element used as input to perform an action on resource 140. For example, the second data element may be a token to authenticate network identity 130 to have a SSH connection with resource 140 without providing any details directly to resource 140.

In step 470, authentication system 100 may enable the action on resource 140 using the first data element. In some embodiments, authentication system 100 may determine the action of actions 124 using the first data element prior to enabling the action on resource 140. Authentication system 100, upon completion of step 470, completes (step 499) executing method 400.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a communication interface method to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces with any of a hardwired, wireless, optical, or similar, medium to communicate with another device, such as a memory bus interface, a processor bus interface, an internet connection, a disk controller, and the like. The communication interface may be configured by providing configuration parameters and/or sending signals to prepare the communication interface to provide a data signal describing the software content. The communication interface may be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within a software developer's skill. The various programs or program modules may be created using a variety of programming techniques. For example, program sections or program modules may be designed by means of JavaScript, Scala, Python, Java, C, C++, assembly language, or any such programming languages, as well as data encoding languages (such as XML, JSON, etc.), query languages (such as SQL), presentation-related languages (such as HTML CSS, etc.) and data transformation language (such as XSL). One or more of such software sections or modules may be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations am possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A non-transitory computer readable medium including instructions that, when executed by at least one processor, cause the at least one processor to perform operations when using a network identity, the operations comprising:
   obtaining a first data element;
   encrypting the first data element using an encryption key;
   storing the encrypted first data element, wherein the encrypted first data element is mapped to a network identity, and wherein the network identity is associated with a data structure to map to at least one of a data element or a data key;
   receiving a request from the network identity to perform an action on a resource distinct from the network identity;
   authenticating the network identity using an existing protocol, wherein the authentication is independent of the action and the resource;
   decrypting the first data element, based on a determination that a trigger event after the authentication has occurred, using a second data element calculated based on standard fields of the existing protocol, wherein the trigger event is configured using a configuration setting stored in association with the action provided in the request and the first data element is associated with the action; and
   performing the action on the resource using the first data element.

2. The non-transitory computer readable medium of claim 1,
   wherein encrypting the first data element using the encryption key further comprises:
   encrypting the first data element using a data key; and
   encrypting the data key using the encryption key.

3. The non-transitory computer readable medium of claim 2,
   wherein storing the encrypted first data element includes storing the encrypted first data element and the encrypted data key.

4. The non-transitory computer readable medium of claim 2,
   wherein the encrypted first data element is mapped to the network identity, wherein the mapping includes mapping the stored encrypted first data element and the encrypted data key to the network identity.

5. The non-transitory computer readable medium of claim 1,
   wherein decrypting the first data element using a second data element calculated based on standard fields of the existing protocol occurs as part of an authentication of the network identity.

6. The non-transitory computer readable medium of claim 1,
   wherein the decrypted first data element cannot be calculated by the network identity.

7. The non-transitory computer readable medium of claim 1,
   wherein the operations further comprise:
   calculating the second data element by the network identity.

8. The non-transitory computer readable medium of claim 1,
   wherein performing the action further comprises:
   determining the action based on the first data element; and
   performing the determined action.

9. The non-transitory computer readable medium of claim 1,
   wherein the first data element is at least one of: a token, a secret, a text, or a file.

10. The non-transitory computer readable medium of claim 1,
    wherein the existing protocol is at least one of: RDP, SSH, Password Authentication Protocol (PAP), Challenge Handshake Authentication Protocol (CHAP), Extensible Authentication Protocol (EAP), AKA, Basic access authentication, CAVE-based authentication, CRAM-MD5, Digest, Host Identity Protocol (HIP), NTLM, Kerberos, OpenID, Radius, SMAL, OAuth2, LDAP, SRP, RFID-Authentication Protocols, Woo Lam 92, HTTPS, or TLS.

11. The non-transitory computer readable medium of claim 1,
    wherein the standard fields are fields of an extension of the existing protocol.

12. The non-transitory computer readable medium of claim 1,
    wherein the standard fields include only one field.

13. The non-transitory computer readable medium of claim 1,
    wherein the standard fields include a nonce and a response to the nonce by the existing protocol.

14. The non-transitory computer readable medium of claim 1,
    wherein the standard fields include an RDP license of a network identity.

15. The non-transitory computer readable medium of claim 1,
wherein using the standard fields does not affect performance or security of the existing protocol.

16. The non-transitory computer readable medium of claim 1,
wherein authenticating the network identity includes a multi-factor authentication.

17. The non-transitory computer readable medium of claim 16,
wherein the standard fields include one or more factors of the multi-factor authentication.

18. The non-transitory computer readable medium of claim 1,
wherein authenticating the network identity includes use of a post-quantum public key cryptography.

19. The non-transitory computer readable medium of claim 1, wherein the second data element can be calculated only by cooperation of the network identity and the resource.

20. The non-transitory computer readable medium of claim 1, wherein the encrypted first data element is stored in the resource or another resource.

21. A computer-implemented method for performing operations when using a network identity, the operations comprising:
obtaining a first data element;
encrypting the first data element using an encryption key;
storing the encrypted first data element, wherein the encrypted first data element is mapped to a network identity, and wherein the network identity is associated with a data structure to map to at least one of a data element or a data key;
receiving a request from the network identity to perform an action on a resource distinct from the network identity;
authenticating the network identity using an existing protocol, wherein the authentication is independent of the action and the resource;
decrypting the first data element, based on a determination that a trigger event after the authentication has occurred, using a second data element calculated based on standard fields of the existing protocol, wherein the trigger event is configured using a configuration setting stored in association with the action provided in the request and the first data element is associated with the action; and
performing the action on the resource using the first data element.

22. An authentication system comprising:
one or more memory devices storing processor-executable instructions; and
one or more processors configured to execute the instructions to cause the authentication system to perform operations comprising:
obtaining a first data element;
encrypting the first data element using an encryption key;
storing the encrypted first data element, wherein the encrypted first data element is mapped to a network identity, and wherein the network identity is associated with a data structure to map to at least one of a data element or a data key;
receiving a request from the network identity to perform an action on a resource distinct from the network identity;
authenticating the network identity using an existing protocol, wherein the authentication is independent of the action and the resource;
decrypting the first data element, based on a determination that a trigger event after the authentication has occurred, using a second data element calculated based on standard fields of the existing protocol, wherein the trigger event is configured using a configuration setting stored in association with the action provided in the request and the first data element is associated with the action; and
performing the action on the resource using the first data element.

* * * * *